April 16, 1940.   A. BOORMAN   2,197,680
COLLAPSIBLE TUBE
Filed Jan. 31, 1939   2 Sheets-Sheet 1

INVENTOR
ARTHUR BOORMAN
by his attorneys
Howson and Howson

April 16, 1940.    A. BOORMAN    2,197,680
COLLAPSIBLE TUBE
Filed Jan. 31, 1939    2 Sheets-Sheet 2

INVENTOR
ARTHUR BOORMAN
by his attorneys
Howson and Howson

Patented Apr. 16, 1940

2,197,680

UNITED STATES PATENT OFFICE 2,197,680

COLLAPSIBLE TUBE

Arthur Boorman, London County, England, assignor to Betts & Company Limited, London, England, a British company Application January 31, 1939, Serial No. 253,919
In Great Britain December 16, 1938

19 Claims. (Cl. 207—10)

This invention relates to collapsible tubes of the kind wherein the nozzle is made from material which differs from that which composes the wall of the tube.

The principal object of the present invention is to provide a more simple and efficient method of constructing such tubes than those hitherto in use.

It has previously been proposed to provide non-staining and mouldable thermo-plastic or thermo-setting nozzles which may be cleated into a metal tube after extrusion and during the production of the said tube. Such nozzles however, are unsuitable for incorporation in the tube during extrusion as they are not sufficiently strong to withstand, without fracture, the pressure required to extrude the tube.

It has further been proposed to extrude a tube from a disc of extrudable material having its centre formed from extrudable material of different kind. This arrangement does not provide satisfactory tubes unless certain steps forming the subject of the present invention are carried out.

The present invention consists in the method of constructing a collapsible tube of the aforesaid kind which consists in providing a disc having a hole in its centre, inserting in the said hole an element formed of a different material the said element having a shoulder thereon of greater diameter than the said hole, placing the said disc and element in a die applying extrusion pressure thereto and thereby forming the said disc and element into a collapsible tube.

Figure 1:
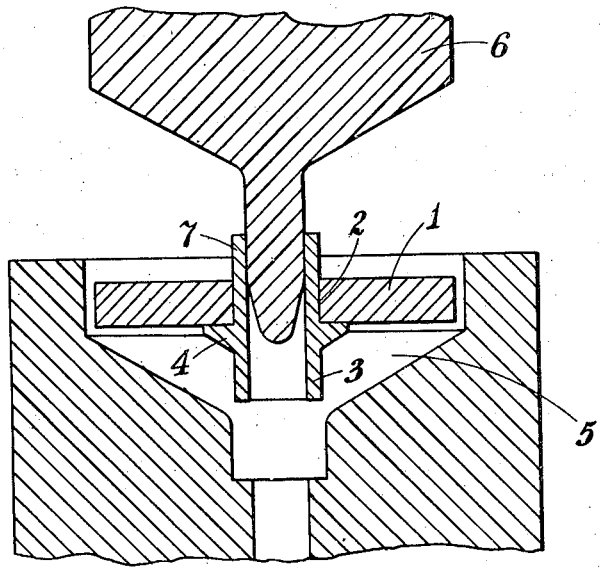
Figure 2:
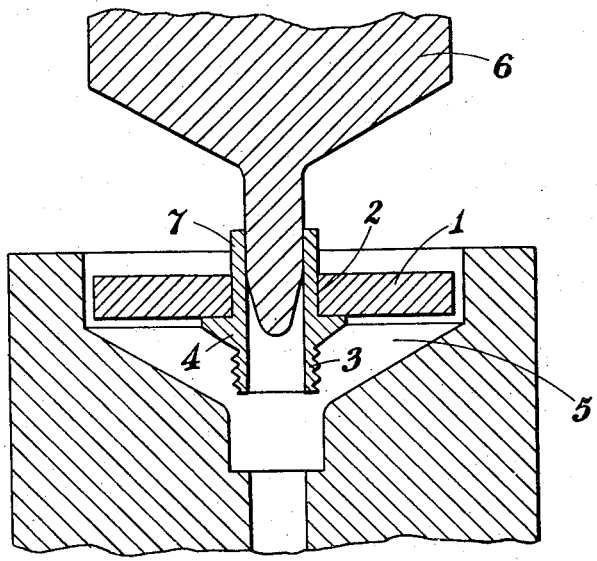
Figure 3:
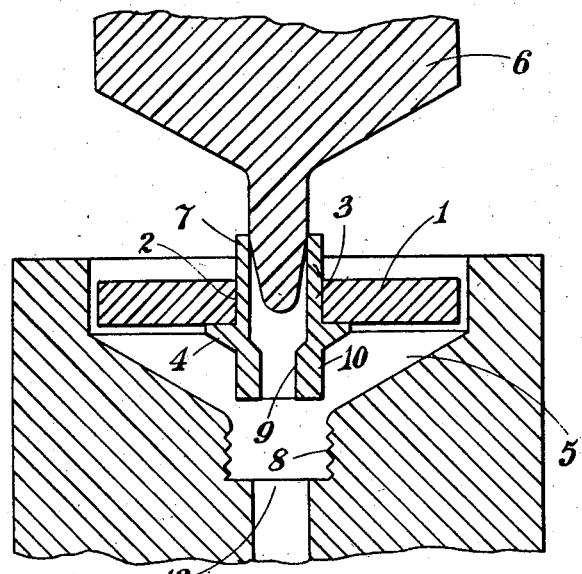

A convenient form of the invention which is given by way of example will hereinafter be described with reference to the accompanying drawings in which:

Figure 1 shews a section of the disc and element arranged within a die prior to extrusion; Figure 2 shews a modification of the invention wherein the element is shaped prior to insertion into the hole in the disc; Figure 3 shews a section similar to Figure 1 wherein the element is made from non-extrudable metal and Figure 4 shews a section similar to Figure 1 wherein the threads on the nozzle are formed during the extrusion.

Referring to Figure 1 of the drawings a disc 1, which is preferably but not necessarily made from lead is provided with a hole 2 at its centre. An element 3, which may be constructed for example from tin, is provided with a shoulder 4, the said shoulder being of greater diameter than the hole 2. The element 3 is inserted into the hole in the disc 1 in the position shewn in Figure 1 of the drawings. Thereafter both the disc and the element are placed in a suitably shaped die 5 and pressure is applied thereto by the male portion of the die 6. By suitably shaping the dies 5 and 6 and applying the required pressure the disc 1 is extruded into the space between the dies and forms a tube while at the same time the shoulder 4 is extruded in the same manner on the outside thereby forming a plated cover and the excess material 7 in the initial movement of the upper die 6 is cleated over the disc and thereafter extruded between the dies thereby forming a lining to the tube. In this manner, assuming the disc to be of lead and the element 3 of tin, a tube will be formed in one operation and will comprise a nozzle 8 of tin and a wall of lead plated on both sides with tin. If desired the disc may be plated on one or both sides with tin or other suitable material prior to its insertion into the die. In this case the said plating will unite with the material of the shoulder and/or the excess material when the latter is extruded. The said plating may also be provided on the disc shewn in the modifications hereinafter to be described.

The element 3 is of greater length than the thickness of the disc and may be provided either with a hole passing through its axis as shown in the drawing or with a hole extending only partly through the element in which case the nozzle of the tube will be provided with a closed outlet which may be pierced when it is desired to extract the contents of the tube. If desired excess material 7 may be cleated over the disc prior to the insertion of the disc and element into the die or as hereinbefore stated the cleating may be carried out in one operation with the extrusion.

From the above description it will be seen that by regulating the quantity of material in the shoulder 4 and the pressure applied thereto the shoulder or shoulder and wall of the tube can be plated on the outside or in the case where a plated disc is used the said plating will be reinforced; in the same way by regulating the amount of excess material 7 the thickness of the plating within the tube may be controlled. For example, if it is desired to provide a tube completely plated inside and/or outside, more material will have to be be used than if the plating is to be carried out only on or partly on the inside and/or outside of the shoulder.

In the arrangement shewn in Figure 3 the element 2 is made from non-extrudable material, such for example as Monel metal. The element has, however, the shoulder 3 and excess material 7 and is passed through the disc 1 in the same manner as described with reference to Figure 1. In the present instance the female die 5 is provided with screw-threads 8 so that when the male die descends the additional metal 9 together with the wall 10 is pressed into the screw-threads 8 thus making the passage through the centre of the element of constant diameter and at the same time forming screw-threads on the end of the element which constitutes the nozzle. The excess material 7 is cleated over the disc 1 and firmly unites the element to the disc while the extrusion pressure is being exerted. Thus, the element is provided with screw-threads, united to the disc and the disc is extruded to form the tube wall, all under one pressure and in one operation.

If desired the elements may be made from non-extrudable material, the nozzle portion being plain, that is to say no screw-threads are formed thereon during extrusion.

Figure 4:
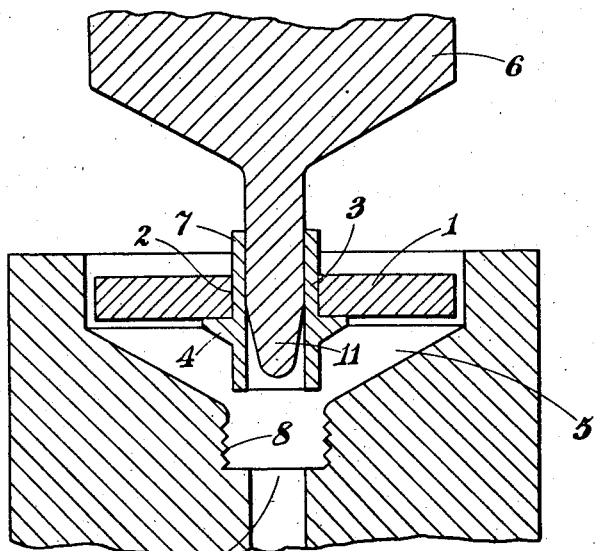

Referring to Figure 4, the element is made from extrudable material. In order to provide screw-threads on the element to form a threaded nozzle during the process of extrusion, the female die is provided with a threaded portion and the pin 11 of the male die is extended so that it closes the aperture 12 prior to extrusion. Thus, when the male die descends the pin reaches the aperture 12 thereby closing the said aperture and upon continued movement of the said die, extrusion pressure is applied thereby extruding the metal into the threads formed in the female die.

In some cases, by suitable construction of the dies it will be unnecessary for the excess material 7 to extend beyond the disc 1 or even completely through it, while at the same time permitting the nozzle to be efficiently secured both inside and outside to the tube.

From the above it will be seen that a plated collapsible tube is provided made from two different materials the nozzle of the said tube also, if desired, being provided with screw-threads thereon all in one operation.

What I claim is:

1. The method of constructing a collapsible tube of the kind referred to which consists in providing a disc having a hole in its centre, inserting in the said hole an element formed of a different material, the said element having a shoulder thereon of greater diameter than the said hole, placing the said disc and element in a die, applying extrusion pressure thereto and thereby forming the said disc and element into a collapsible tube.

2. A collapsible tube comprising a disc having a hole in its centre, an element of different material inserted in said hole, said element having a shoulder thereon of greater diameter than said hole, one end of said element forming the nozzle of said tube, said disc and element being extruded in a die, and thereby formed into a collapsible tube.

3. A collapsible tube comprising a disc having a hole in its centre, an element of different material inserted in said hole, said element having a shoulder thereon of greater diameter than said hole, said disc and element being extruded in a die and thereby formed into a collapsible tube, said tube being plated on at least one side, one end of said element forming the nozzle of said tube of only one kind of material.

4. A collapsible tube comprising a disc having a hole in its center, a nozzle element of different material inserted in said hole, said nozzle element having an internal axial passage and an external shoulder of greater diameter than said disc hole, said disc and element being extruded in a die and thereby formed into a collapsible tube.

5. A collapsible tube comprising a disc having a hole in its centre, a nozzle element of different material inserted in said hole, said nozzle element being provided with a hole for part of its length and an external shoulder of greater diameter than said disc hole, said disc and element being extruded in a die and thereby formed into a collapsible tube.

6. A collapsible tube comprising a disc having a hole in its centre, an element of different material inserted in said hole, said element having a shoulder thereon of greater diameter than said hole, said disc and element being extruded in a die and thereby formed into a collapsible tube, said element being cleated over said disc before completion of the extrusion.

7. A collapsible tube comprising a disc having a hole in its centre, an element of different material inserted in said hole, said element having a shoulder thereon of greater diameter than said hole, said disc and element being extruded in a die and thereby formed into a collapsible tube, said disc being plated with another material prior to its insertion in the die, said element comprising such a quantity of material that when extruded it reinforces the existing plating on the disc.

8. A collapsible tube comprising a disc having a hole in its centre, an element of different material inserted in said hole, said element having a shoulder thereon of greater diameter than said hole, said disc and element being extruded in a die and thereby formed into a collapsible tube, said element comprising such a quantity of material that the shoulder of the tube is plated on at least one side.

9. A collapsible tube comprising a disc having a hole in its centre, an element of different material inserted in said hole, said element having a shoulder thereon of greater diameter than said hole, said disc and element being extruded in a die and thereby formed into a collapsible tube, said element containing such a quantity of material that the shoulder and wall of said tube are plated on at least one side.

10. A collapsible tube comprising a disc having a hole in its centre, an element of non-extrudable material inserted in said hole, said element having a shoulder thereon of greater diameter than said hole, said disc and element being extruded in a die and thereby formed into a collapsible tube.

11. A collapsible tube comprising a disc having a hole in its centre, an element of different material inserted in said hole, said element having a shoulder thereon of greater diameter than said hole, said disc and element being extruded in a die and thereby formed into a collapsible tube, said element having screw threads formed on one end thereof by pressure during the extrusion of the disc.

12. A collapsible tube comprising a disc of extrudable material having a hole in its centre, an element of non-extrudable material inserted in said hole, said element having a shoulder thereon of greater diameter than said hole, said disc and element being pressed in a die and said disc extruded thereby forming the collapsible tube, one end of said element having screw threads, the other end thereof being cleated to the disc at the same time that the disc is being extruded.

13. A collapsible tube comprising a disc of extrudable material having a hole in its centre, an element of non-extrudable material inserted in said hole, said element having a shoulder thereon of greater diameter than said hole, said disc and element being pressed in a die and said disc extruded thereby forming the collapsible wall of said tube, one end of said element being provided with screw threads and the other end being cleated to the disc at the same time that the disc is being extruded.

14. A collapsible tube comprising a disc having a hole in its centre, an element of different material inserted in said hole, said element having a shoulder thereon of greater diameter than said hole, said disc and element being pressed in a die and said disc extruded thereby forming said disc and element into a collapsible tube, said element being made of non-extrudable material and provided with preformed screw threads thereon to form a nozzle.

15. A collapsible tube comprising a disc having a hole in its centre, an element of different material inserted in said hole, the length of said element exceeding the thickness of said disc, said element having a shoulder thereon of greater diameter than said hole, said disc and element being extruded in a die and thereby formed into a collapsible tube.

16. The method of constructing a collapsible tube of the kind referred to which consists in providing a disc of lead plated on at least one side with tin and having a hole in its centre, inserting an element of tin in said hole, said element having a shoulder thereon of greater diameter than said hole, placing said disc and element in a die, applying extrusion pressure thereto and thereby forming the said disc and element into a collapsible tube.

17. A collapsible tube comprising a disc having a hole in its centre, an element of different material having a shoulder of greater diameter than said hole and having excess material extending partly through the disc, said disc and element being extruded in a die and thereby formed into a collapsible tube.

18. Method of constructing a collapsible tube which comprises forming a disc of extrudable material having a hole in its centre, inserting in said disc hole a hollow nozzle element formed of different material with an external annular shoulder of greater diameter than said disc hole engaging one side of said disc and having excess material extending beyond the other side of said disc, applying to the shoulder side of said element and disc a female die part having a central recess receiving said nozzle and a surrounding area receiving said shoulder and disc, applying to the excess material side of said element and disc a male die part having a projecting central portion entering the hollow of said element and a surrounding area corresponding to that of said female die part but of smaller diameter, and applying extrusion pressure to said die thereby simultaneously spreading said shoulder and excess material to plate the respective sides of said disc and to form the collapsible tube out of the margin of said disc extruded between the peripheries of said die parts.

19. A collapsible tube comprising a disc of extrudable material having a hole in its centre, a hollow nozzle element inserted in said hole and having an external annular shoulder of greater diameter than said hole engaging one side of said disc and having excess material extending beyond the other side of said disc, said shoulder and excess material being spread over the respective sides of said disc and plating the same, the margins of said disc being extruded axially and annularly and forming the collapsible tube.

ARTHUR BOORMAN.